(12) United States Patent
Subramanian

(10) Patent No.: US 8,863,917 B2
(45) Date of Patent: Oct. 21, 2014

(54) FRICTION MATERIAL FOR BRAKES

(75) Inventor: Vijay Subramanian, Kerala State (IN)

(73) Assignee: Federal-Mogul Products, Inc., Southfield, MI (US)

(*) Notice: Subject to any disclaimer, the term of this patent is extended or adjusted under 35 U.S.C. 154(b) by 55 days.

(21) Appl. No.: 13/212,445

(22) Filed: Aug. 18, 2011

(65) Prior Publication Data
US 2011/0297496 A1 Dec. 8, 2011

Related U.S. Application Data

(63) Continuation-in-part of application No. 12/245,222, filed on Oct. 3, 2008, now abandoned.

(51) Int. Cl.
*F16D 69/02* (2006.01)

(52) U.S. Cl.
CPC .................................. *F16D 69/026* (2013.01)
USPC ....................... 188/251 A; 523/156

(58) Field of Classification Search
CPC ...... F16D 69/02; F16D 69/001; F16D 69/026
USPC ....... 188/250 R, 251 R, 251 A; 523/149, 152, 523/155–157
See application file for complete search history.

(56) References Cited

U.S. PATENT DOCUMENTS

| | | | |
|---|---|---|---|
| 4,384,054 A | 5/1983 | Moraw et al. | |
| 4,477,605 A | 10/1984 | Okubo | |
| 4,792,361 A * | 12/1988 | Double et al. | 106/644 |
| 4,944,373 A | 7/1990 | Ohya et al. | |
| 5,087,642 A | 2/1992 | Seki | |
| 5,856,278 A | 1/1999 | Brewer | |
| 6,139,673 A * | 10/2000 | Sasaki et al. | 156/242 |
| 6,167,992 B1 * | 1/2001 | Torpey et al. | 188/73.1 |
| 6,194,059 B1 | 2/2001 | Yesnik | |
| 6,220,404 B1 | 4/2001 | Hara et al. | |
| 6,372,817 B1 | 4/2002 | Kinouchi et al. | |
| 6,451,872 B1 | 9/2002 | Yamane | |

(Continued)

FOREIGN PATENT DOCUMENTS

| | | |
|---|---|---|
| EP | 1482203 A1 | 12/2004 |
| GB | 2305433 A | 4/1997 |

(Continued)

OTHER PUBLICATIONS

International Search Report PCT/US2012/050686 mailed on Dec. 5, 2012.

*Primary Examiner* — Anna Momper
(74) *Attorney, Agent, or Firm* — Robert L. Stearns; Dickinson Wright, PLLC

(57) ABSTRACT

A metal fiber, copper, and titanate free non-asbestos friction material for brake pads is provided. The friction material includes a binder, such as a phenolic resin, forming 16-24 % by volume; a fiber, such as aramid fiber, forming 4-12 % by volume; a lubricant, such as a blend of antimony tri-sulfide and another metal sulfide, forming 2-5 % by volume; and at least one abrasive, such as a blend of mineral fiber, magnesium oxide, and mica, forming 10-22 % by volume. The friction material further comprises rubber powder in an amount of at least 4 % by volume. The brake pad can be formed by a cost effective process consisting essentially of mixing the ingredients, pressing and curing the friction material to a backing plate, and post baking the brake pad.

23 Claims, 1 Drawing Sheet

(56) References Cited

U.S. PATENT DOCUMENTS

| | | |
|---|---|---|
| 6,482,519 B1 | 11/2002 | Schleifstein |
| 6,497,307 B1 | 12/2002 | Schoo et al. |
| 6,579,920 B2 | 6/2003 | Burnett et al. |
| 6,635,349 B2 | 10/2003 | Horiya et al. |
| 6,656,240 B2 * | 12/2003 | Chiba ............................ 51/307 |
| 7,097,009 B2 | 8/2006 | Shao et al. |
| 7,205,049 B2 | 4/2007 | Andrews |
| 7,294,188 B2 | 11/2007 | Shao et al. |
| 7,297,728 B2 | 11/2007 | Yamamoto et al. |
| 7,740,698 B2 | 6/2010 | Kitami et al. |
| 2002/0086159 A1 | 7/2002 | Horiya et al. |
| 2003/0018118 A1 | 1/2003 | Burnett |
| 2003/0049426 A1 | 3/2003 | Kobayashi et al. |
| 2005/0014862 A1 | 1/2005 | Kusaka et al. |
| 2006/0151268 A1 * | 7/2006 | Kesavan et al. ............ 188/251 A |
| 2007/0142500 A1 | 6/2007 | Shao et al. |
| 2008/0035025 A1 | 2/2008 | Andrews |
| 2009/0011962 A1 * | 1/2009 | Chinda et al. .................. 508/167 |
| 2013/0220746 A1 * | 8/2013 | Unno et al. ................ 188/251 A |

FOREIGN PATENT DOCUMENTS

| | | |
|---|---|---|
| JP | 2002138273 | 5/2002 |
| JP | 2003322183 | 11/2003 |
| WO | 2011049576 A1 | 4/2011 |

* cited by examiner

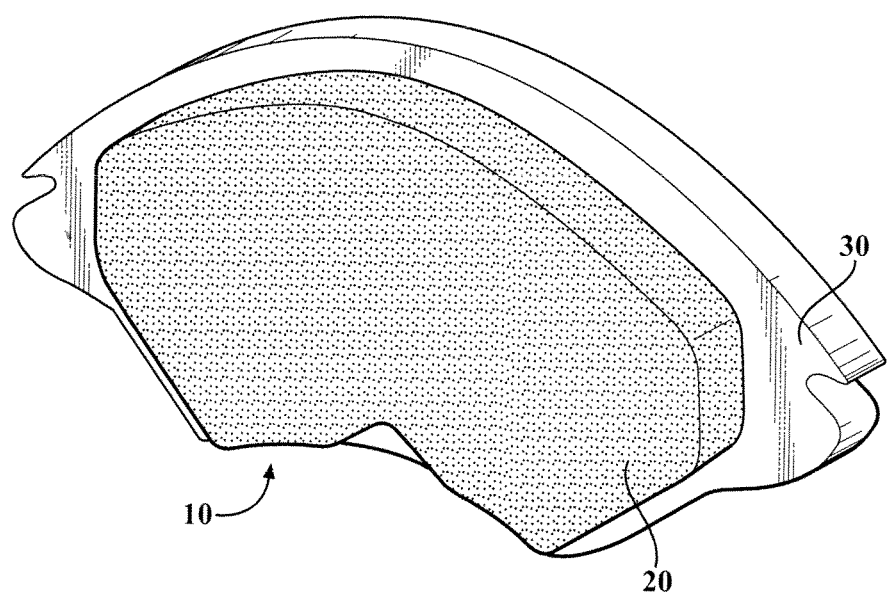

FRICTION MATERIAL FOR BRAKES

CROSS-REFERENCE TO RELATED PATENT APPLICATION

This application is a Continuation-in-Part and claims the benefit of U.S. application Ser. No. 12/245,222, filed on Oct. 3, 2008, now abandoned which is incorporated herein by reference in its entirety.

FIELD OF THE INVENTION

The present invention relates to a non-asbestos friction material and in particular, to a friction material for a brake pad to be used for brakes of vehicles or industrial machines.

BACKGROUND OF THE INVENTION

Copper in non-asbestos-based friction materials for brake pads provides many useful properties and performance characteristics including excellent reinforcing strength, increased friction coefficient at high temperatures and excellent heat transfer properties. In addition, copper provides many other qualities that increase the longevity of the friction material and the components the friction material engages, as well as reduces brake dust. However, copper is expensive and thus those of skill in the art look for more cost effective materials for use in brake pads.

Non-asbestos materials for brake pads also commonly include titanates, for example the friction materials of U.S. Pat. No. 6,656,240 to Chiba et al. Titanates can provide high temperature stability comparable to asbestos type materials. Titanate materials, such as hexatitanate and octatitanate, are useful since they coat the rotor surface with a uniform and consistent transfer layer. However, like copper, titanates are also expensive and thus those of skill in the art look for more cost effective materials for use in brake pads.

Steel fibers have been used in place of copper and titanates in non-asbestos friction materials for brake pads. U.S. Pat. No. 6,220,405 to Kesaven et al discloses examples of copper-free friction materials including steel fibers. However, steel fibers do not have many of the positive attributes of copper and are more frictionally aggressive, thereby increasing the amount of wear on the rotor against which the friction material engages. Steel fibers also generate dust that can quickly and permanently stain the surface finish of the rims of a vehicle.

Copper-free, non-asbestos brake pad materials including high amounts of dust have also been developed. U.S. Pat. No. 6,617,375 to Kobayashi et al discloses examples of copper-free, non-asbestos friction materials including high amounts of cashew dust. However, the processing of such materials provides high scrap rates and requires other costly process steps.

SUMMARY OF THE INVENTION

One aspect of the present invention provides a non-asbestos friction material for a brake that is free of copper, metal fibers, and titanates. The friction material comprises, in percent (%) by volume of the friction material: a binder forming 15-24% by volume; a fiber forming 3-13% by volume; and a lubricant forming 2-6% by volume. The lubricant includes at least one sulfide. The friction material further comprises at least one abrasive forming 9-22% by volume; and a filler forming 46-65% by volume. The filler includes a rubber powder, and the rubber powder forms at least 4% by volume of the friction material. Metal fibers, titanates, and copper, each form not greater than 0.2% by volume of the friction material.

Another aspect of the invention provides a brake pad comprising a backing plate and a friction pad fixed to the backing plate, wherein the friction pad is fabricated of the friction material.

Yet another aspect of the invention provides a method of forming a brake pad, comprising the step of: blending a binder, a lubricant, at least one abrasive, and rubber power to form a homogeneous mixture. The homogeneous mixture includes, based on the total volume of the mixture: a binder forming 15-24% by volume; a fiber forming 3-13% by volume; a lubricant forming 2-6% by volume; the lubricant including at least one sulfide; at least one abrasive forming 9-22% by volume; a filler forming 46-65% by volume, the filler including a rubber powder, wherein the rubber powder forms at least 4% by volume of the mixture; metal fibers forming not greater than 0.2% by volume; titanates forming not greater than 0.2% by volume; and copper forming not greater than 0.2% by volume. The method further includes pressing the homogeneous mixture under a pressure of 4-25 tons/piece at room temperature to form a friction pad of the mixture; pressing the friction pad and a backing plate together under a pressure of 5-50 tons/piece at a temperature of 265-295° F.; and baking the pressed friction pad and backing plate at a temperature of 330-370° F.

While the prior art includes efforts to at least partially remove copper or copper compounds and certain grades of titanates from friction pad compositions, it has not been known to be successful without sacrificing desirable performance characteristics including stopping capability, longevity, minimal rotor wear, minimal brake dust, and minimal staining of vehicle rims.

However, the inventive friction material overcomes the shortcomings of the prior art by providing performance characteristics similar to those of copper and titanate containing friction materials, at a fraction of the cost, which was completely unexpected. Brake pads formed of the inventive friction material are produced at 30-50% lower cost than other friction materials, such as those containing copper and titanates.

The inventive friction material also provides excellent process capabilities, including high efficiency and unexpected low scrap rates, which contribute to the lower production cost. The scrap rates of the process of forming brake pads using the inventive friction material are about 0.6% of the starting materials, which is about 25% lower than the scrap rates of the prior art, such as processes using friction materials including copper and titanates.

The friction material of the present invention unexpectedly provides the same level of friction, pad life, noise, and other performance characteristics typical of non-asbestos, copper-containing or titanate-containing materials. Brake pads formed of the inventive friction material pass the following vehicle application tests: FMVSS 135 (14% margin stopping distance); life test on vehicle (30,000 miles, minimum); and noise test on vehicle (zero noise).

BRIEF DESCRIPTION OF THE DRAWINGS

The present invention will become more fully understood from the accompanying detailed description, claims, and the drawing in which:

DETAILED DESCRIPTION OF A PREFERRED EMBODIMENT

Figure 1:
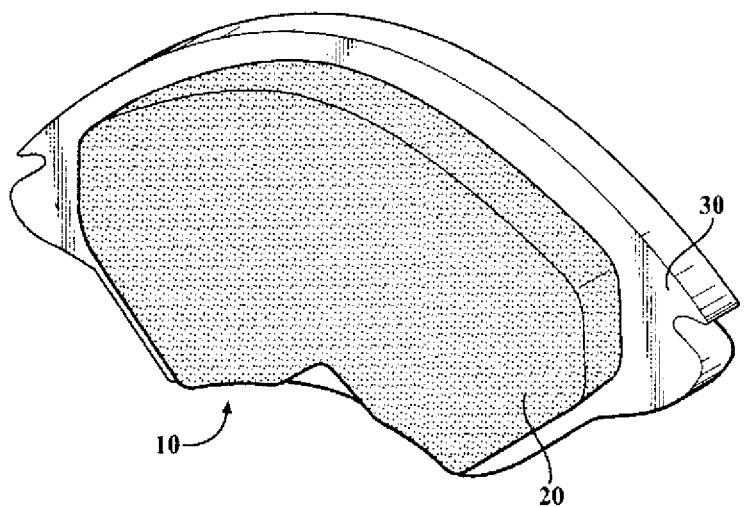
FIG. 1 is a perspective view of an exemplary friction material incorporated into an exemplary brake pad.

Disclosed is a non-asbestos friction material for brake pads and other brake materials that includes a binder; a fiber; a lubricant including at least one sulfide; at least one abrasive; a filler including rubber powder; and which is substantially free of copper, metal fibers, and titanates.

The friction material 20 may be used in the brake pad 10 illustrated in FIG. 1, The brake pad 10 illustrated in FIG. 1 is only an exemplary brake pad and may take on any size, shape or configuration. The friction material 20 when used in a brake pad 10 is typically bonded or otherwise secured to a backing plate 30.

By non-asbestos, it is meant the friction material includes asbestos in an amount of not greater than 0.2% by volume, preferably not greater than 0.1% by volume, and most preferably 0% by volume, based on the total volume of the friction material, after processing.

Substantially free of copper means the friction material is substantially free of copper, or alloys of copper, such as brass and bronze, and includes each copper-containing material in an amount of not greater than 0.2% by volume, preferably not greater than 0.1% by volume, and most preferably 0% by volume, based on the total volume of the friction material, after processing.

Substantially free of me fibers means the friction material includes metal fibers, such as steel or bronze fibers, in an amount of not greater than 0.2% by volume, preferably not greater than 0.1% by volume, and most preferably 0% by volume, based on the total volume of the friction material, after processing. Metal fibers, that are preferably not used in the friction material, can be formed of any metal or metal alloy and typically have a length of 0.5 mm to 10 mm.

By substantially free of titanates, it is meant to be substantially free of compounds like potassium titanate, magnesium potassium titanate, lithium potassium titanate, calcium potassium titanate, and other hexa and octa-titanates and other titanates developed as asbestos alternatives. The friction material includes titanates in an amount of not greater than 0.2% by volume, preferably not greater than 0.1% by volume, and most preferably 0% by volume, based on the total volume of the friction material, after processing.

The non-asbestos friction material of the invention includes at least one binder forming approximately 16-24% by volume of the total friction material, after processing, and preferably 18-22% by volume. The binder includes at least one resin, for example a phenolic resin of either straight, unmodified, or modified phenolic resin form. Examples of modified binders include silicone, acrylic, epoxy, and nitrile. The binder serves as a matrix that holds the other ingredients together in the friction material. The binder system may also comprise a mixture of two or more types of binders, at least one of which is a phenolic type binder if desired for a particular application to achieve a desired performance characteristic. In one embodiment, the resin is a blend of a phenolic and non-phenolic resin. In another embodiment, the binder is an unmodified phenolic resin and is present in an amount of 16-24% by volume, or 18-22% by volume, or 21% by volume.

The fiber of the friction material has a length of 0 5 mm to 10 mm and forms approximately 4-12% by volume of the total friction material, after processing, preferably 4-8% by volume. The fiber is preferably chosen from one or more of aramid fibers, poly acrylonitrile (PAN) fibers, and cellulose fibers. Aramid fibers preferably have an average length of 1.09 mm with an approximate range of 0.92 mm to 1.26 mm. PAN fibers have a length range of about 5.0 to 7.5 mm. Cellulose fibers have a length less than 1 mm. The fibers provide integrity and structural strength to the friction material. Fibers also help with stability of pre-cured preforms during the manufacturing process. Various fibers and fiber lengths can thus be used to control manufacturing and performance characteristics of the friction material. The fibers can be synthetic or natural in origin, and pure or recycled in form. In one embodiment, the fiber includes an aramid and is present in an amount of 4-12% by volume, or 4-8% by volume, or 7% by volume.

The lubricant includes at least one sulfide and forms approximately 2-5% by volume, preferably 2-4% by volume. In another embodiment, the lubricant forms not greater than 5% by volume, or not greater than 5% by volume. The lubricant is included in the friction material to reduce pad and disc wear during service. Candidate lubricant materials include metal sulfides, non-metal sulfides, organic lubricants, metal lubricants or a combination thereof. Examples of metal sulfides include, but are not limited to, tin sulfides, antimony tri-sulfide, antimony trioxide, zinc sulfide, and iron sulfide. An example of an organic lubricant is phthalocyanine and examples of metal lubricants include tin and zinc powders. Metal sulfides include metal sulfide complexes such as those having tin sulfide as one of the main ingredients. In one embodiment, the lubricant includes a blend of antimony tri-sulfide and at least one metal sulfide different from the antimony tri-sulfide, each in an amount of 1-3% by volume, or each in an amount of 2% by volume.

The friction material further includes at least one abrasive, such as a hard abrasive or a mild abrasive. The abrasives form approximately 10-22% by volume of the friction material, after processing, preferably 12-18% by volume. More specifically, the hard abrasives typically form approximately 3-14% while the mild abrasives form approximately 3-14% by volume of the friction material. Examples of hard abrasives include certain mineral fibers, zirconia, alumina, magnesium oxide, zirconium silicate, silica, silicon dioxide, sand, silicon carbide, mullite, and iron oxide. Hard abrasives tend to have higher values on the Mohs hardness scale. Other examples of abrasives include some grades of ceramic fibers including complex mineral silicates such as calcium magnesium silicate, calcium magnesium zirconium silicate, calcium magnesium aluminum silicate, and magnesium aluminum silicate. Other known abrasives that are mild in nature include iron oxides of different chemistries, other metallic oxides, and materials and minerals that have relatively lower values on the Mohs hardness scale. The hard abrasives are generally used in low concentrations while the mild abrasives are typically used in higher concentrations to achieve the same desired friction level.

In one embodiment, the abrasives include magnesium oxide in an amount of 3-8% by volume, or 4-7% by volume, or 5% by volume, based on the total volume of the friction material. In another embodiment, the abrasives include magnesium oxide in an amount not greater than 10% by volume, or not greater than 7% by volume, based on the total volume of the friction material.

In another embodiment, the abrasives include a blend of magnesium oxide, mineral fiber, such as a bio soluble grade of mineral fiber, and mica, each present in an amount of 3-8% by volume, or each not greater than 7% by volume, or each 5% by volume, based on the total volume of the friction material.

The other ingredients included in the friction material form the balance of the composition and are classified generally as fillers and/or modifiers. The filler at least includes rubber powder, and typically includes a blend of several components. The filler makes up approximately 46-64% of the friction material, after processing, and preferably 49-57% by volume. The filler generally provides bulk to the formulation, reduce cost, provide noise reduction and help with coating the rotor surface with a uniform transfer layer. Examples of suitable fillers include lime, calcium oxide, barytes, including barium sulfate, graphite, petroleum coke, desulfurized coke, calcium silicate, rubber including various powder rubbers, such as powdered nitrile rubber, and recycled rubber, and friction dust including brown, black, straight, modified or other grades of friction dust.

In one embodiment, the rubber powder of the filler is present in an amount of 4-16% by volume, or 9% by volume, based on the total volume of the friction material. In another embodiment, in addition to the rubber powder in the amount of 4-16% by volume, the filler further includes graphite in an amount of 3-9% by volume, or at least 5% by volume, or 6% by volume; petroleum coke in an amount of 3-9% by volume, or 6% by volume; barytes in an amount of 15-30% by volume, or 21% by volume; friction dust in an amount of 4-16% by volume, or 9% by volume; and hydrated lime in an amount of 1-3% by volume, or 2% by volume.

Further, in one embodiment, the friction material is substantially free of iron, and thus includes iron in an amount not greater than 5% by volume, or not greater than 2%, or less than 1%, or 0% by volume, based on the total volume of the friction material, after processing.

In another embodiment, the friction material is substantially free of wetting agent, and thus includes wetting agent in an amount not greater than 5% by volume, or not greater than 2%, or 1% by volume, based on the total volume of the friction material, after processing. The wetting agent is also known as a surfactant, detergent, emulsifier, foaming agent, or dispersant. The wetting agent is a chemical substance or blend of chemical substances that increases the spreading and penetrating properties of a liquid by lowering its surface tension. The wetting agent can lower the surface tension of a liquid, the interfacial tension between two liquids, or that between a liquid and a solid.

The friction material is processed and formed by mixing, pressing, and curing operations typically used in the industry to make brake pad friction materials. This involves dry mixing the ingredients in a standard tumble mixer, with optional use of plows and choppers, to blend the ingredients into a homogeneous mixture. The total mixing time is about 7 minutes.

The mixture is then pressed, preferably under a pressure of 4-25 tons/piece into friction pads in the form of preforms or pucks using a room temperature press operation. The preforming time is approximately 5 seconds. Variations in the process may include loose filling the mix into the pressing mold directly or by use of a liquid binder system.

The preforms or pucks are then placed into a hot block mold with a metal backplate on one side and hot press cured to bond cured friction material to the backing plate to form the final brake pad. The friction material may be attached directly to the backplate or with use of an underlayer material, as is well known in the industry. The pressing is preferably conducted at a pressure of 5-50 tons/piece and temperature of 265-295° F. The total pressing time is about 250 seconds.

The brake pads bound for market further undergo a post bake operation. The baking of the pressed friction pad and baking plate is preferably conducted in a standard air convention oven at a temperature of 330-370° F. The total post bake time is about 6 hours. The brake pads for market would also undergo one or more finishing operations, before being packaged for commercial sale.

The brake pads can be formed by a process consisting essentially of the mixing, pressing, and post baking steps described above, meaning other significant or costly process steps are not required. The excellent process capability of the inventive friction material was completely unexpected and contributes to the 30-50% cost reduction over the prior art.

The following Examples 1, 2, and 10 provide exemplary inventive friction materials prepared using the present invention and have sufficient performance characteristics. Examples 3-9 provide comparative friction materials. The friction materials of each Example were processed and formed into brake pads according to the mixing, pressing, curing, and post baking operations described above. Each of the examples were also evaluated for certain manufacturing characteristics including mixing, preforming, pressing, physical hardness, physical compression. The friction materials were further evaluated for bonding to the back plate at room temperature and at 265-295° F., as well as certain performance characteristics including friction pad life, pad wear, rotor wear characteristics and costs. All compositions described below are expressed in volume %, based on the total volume of the final friction material product, after processing, and have been rounded off to the nearest whole number for simplicity.

INVENTIVE EXAMPLE 1

| | |
|---|---|
| Binder | 21 |
| Fiber | 7 |
| Lubricant | 4 |
| Total Abrasives | 15 |
| Filters | 53 |
| Copper and Copper alloys | 0 |
| Titanates | 0 |
| Total | 100 |

The friction material of Example 1 was found to have good all-around manufacturing and performance characteristics, similar to those of copper-containing or titanate-containing friction materials. The friction material provided the same level of friction, pad life, noise, and other performance characteristics typical of non-asbestos friction materials containing copper and titanate. The friction material also provided excellent process capabilities, including high efficiency and unexpected low scrap rates.

INVENTIVE EXAMPLE 2

| | |
|---|---|
| Binder | 24 |
| Fiber | 7 |
| Lubricant | 4 |
| Total Abrasives | 15 |
| Fillers | 50 |
| Copper and Copper alloys | 0 |
| Titanates | 0 |
| Total | 100 |

Some variations in Example 2 as compared to Example 1 included extremely low void volumes in the pad. Generally a very desirable characteristics for brake pads is low noise levels since the noise from braking is a common cause of customer complaints related to braking systems. Low level voids also correlate to very stiff pads with very low compressibility values. This material showed the lowest compressibility properties of all the examples tested, demonstrating that the high resin binder level affects this property. The bonding to the back plate both at room temperature and at 265-295° F. was excellent, and very low press pressures were required to get acceptable pad integrities. However, due to the low compressibility and in particular the low voids potentially causing noise, a binder level above 24% by volume of the friction material would be undesirable. Therefore, it is believed that 24% of binder by volume is the maximum level of binder that may be used in a volume percent of the final friction composition.

COMPARATIVE EXAMPLE 3

| Binder | 15 |
|---|---|
| Fiber | 7 |
| Lubricant | 4 |
| Total Abrasives | 15 |
| Fillers | 59 |
| Copper and Copper alloys | 0 |
| Titanates | 0 |
| Total | 100 |

The final friction composition of Example 3 had generally good performance characteristics although the preforming and bonding to the back plate at 265-295° F. characteristics were not as good as the friction material in mixture Example 1. It is believed that the binder 15% by volume or less detracts from the bonding characteristics of the friction material and in particular, bonding the friction material to the back plate at 265-295° F. The friction material of Example 3 did not provide the excellent bonding characteristics provided by Example 2.

COMPARATIVE EXAMPLE 4

| Binder | 21 |
|---|---|
| Fiber | 3 |
| Lubricant | 4 |
| Total Abrasives | 15 |
| Fillers | 57 |
| Copper and Copper alloys | 0 |
| Titanates | 0 |
| Total | 100 |

Example 4 reduces the fiber content to 3% by volume. In comparison to the friction material of Example 1, the pad was difficult to preform and had low physical compression as well and was somewhat difficult to bind to the back plate at 265-295° F. The cured friction material was unacceptably brittle. Therefore, the pads should include more than 3% and preferably 5% or more by volume fiber to provide acceptable performance characteristics.

COMPARATIVE EXAMPLE 5

| Binder | 21 |
|---|---|
| Fiber | 13 |
| Lubricant | 4 |
| Total Abrasives | 15 |
| Fillers | 47 |
| Copper and Copper alloys | 0 |
| Titanates | 0 |
| Total | 100 |

The material of Example 5 employed a high level of fiber which produced good performance characteristics but some process difficulties. During processing, the high level of fiber made this material difficult to mix, but dividing the mix into smaller batches helped. However, smaller batches would significantly increase the cost of manufacturing of the material and thus would be undesirable. Therefore, the friction material should have less than 13% by volume of fibers in the total composition and more particularly, approximately 5-9% by volume of the total composition.

COMPARATIVE EXAMPLE 6

| Binder | 21 |
|---|---|
| Fiber | 7 |
| Lubricant | 0 |
| Total Abrasives | 15 |
| Fillers | 57 |
| Copper and Copper alloys | 0 |
| Titanates | 0 |
| Total | 100 |

Example 6 had generally good all-around characteristics. However, the preforming and pressing of the processing stage were negatively affected by the lack of lubricants. Without the lubricants, it was found that the preforms were not as stable when pressed at low pressures and that pressure had to be significantly increased to maintain preform integrity and that the parts had to be press cured for longer. It is believed that the presence of lubricants is not only important to the frictional wear properties of the brake pads once manufactured, but also during the preform and pressing stage as the compacting of the ingredients may be influenced by the presence of lubricant materials.

COMPARATIVE EXAMPLE 7

| Binder | 21 |
|---|---|
| Fiber | 7 |
| Lubricant | 6 |
| Total Abrasives | 15 |
| Fillers | 51 |
| Copper and Copper alloys | 0 |
| Titanates | 0 |
| Total | 100 |

In Example 7, the amount of lubricant was increased to 6% by volume. The increase in lubricants was found to require significantly increased pressing and longer cure times in comparison to Example 1. The extremely high level of lubricants influenced the compacting of the ingredients during the preforming stage while the remaining performance characteristics were good. For efficient manufacturing purposes, the material should have less than 6% by volume of the lubricant of the total composition, and preferably under 4% by volume of the total friction material composition. Also, as lubricants are expensive, when combined with the difficulties in processing, it is desirable to minimize the amount of lubricants added. Therefore, at least some lubricant that allows for better pressing is desirable, but it is also desirable to keep the amount of lubricants to about 6% or less and preferably less than 4% by volume.

COMPARATIVE EXAMPLE 8

| Binder | 21 |
| Fiber | 7 |
| Lubricant | 4 |
| Total Abrasives | 9 |
| Fillers | 59 |
| Copper and Copper alloys | 0 |
| Titanates | 0 |
| Total | 100 |

The friction material formed in Example 8 had the lowest levels of abrasive material. The performance characteristics related to friction suffered, as the material had one of the lowest levels of friction coefficient measured among all variations of examples. However, it is believed that other parameters may be adjusted to keep the friction coefficient within the desirable range. Surprisingly, during the processing and formulation stage of the brake pad, the bonding to the back plate and in particular the bonding into the back bond retention plate at 265-295° F. was also negatively affected. Therefore, it is believed that the total amount of abrasives should at least be greater than 9% by volume of the total composition.

COMPARATIVE EXAMPLE 9

| Binder | 21 |
| Fiber | 7 |
| Lubricant | 4 |
| Total Abrasives | 22 |
| Fillers | 46 |
| Copper and Copper alloys | 0 |
| Titanates | 0 |
| Total | 100 |

The friction material of Example 9 increased the level of abrasive material to 22%. The preforming and performance characteristics were good. The formulation processed fairly well with an ease of mixing, preforming and press cycle operations. The hardness of the pads was one of the highest of the materials tested in the Examples. One downside to using such high level abrasives is cost. It is believed that a friction material having approximately 22% or less abrasives is preferred to minimize the cost even though the friction material may have otherwise acceptable performance and processing characteristics.

| Category | Example Composition | Range (% by vol.) | Example Amount (% by vol.) |
| --- | --- | --- | --- |
| Binder | Unmodified Phenolic Resin | 16-24 | 21 |
| Fiber | Aramid | 4-12 | 7 |
| Lubricant | Metal Sulfide | 2-5 | 2 |
|  | Antimony tri-sulfide |  | 2 |
| Abrasive | Mineral Fiber | 10-22 | 5 |
|  | Magnesium Oxide |  | 5 |
|  | Mica |  | 5 |
| Filler | Rubber Powder | 46-65 | 9 |
|  | Graphite |  | 6 |
|  | Petroleum Coke |  | 6 |
|  | Barytes |  | 21 |
|  | Friction Dust |  | 9 |
|  | Hydrated Lime |  | 2 |
| Other | Cu and Cu alloys | 0-0.2 | 0 |
|  | Titanates | 0-0.2 | 0 |
|  | Metal Fibers | 0-0.2 | 0 |
|  | Wetting Agents | 0-0.2 | 0 |

Friction materials including the components of the example composition and within the ranges of Example 10 were processed, formed into brake pads, and tested, as described above. Like the friction material of Example 1, the friction materials of Example 10 provided excellent performance characteristics. The friction materials provided the same level of friction, pad life, noise, stopping capability, longevity, rotor wear, brake dust, staining, and other performance characteristics typical of non-asbestos, copper-containing or titanate-containing materials.

The friction materials of Example 10 also provided excellent process capabilities, including process efficiency and unexpected low scrap rates.

The total scrap rate of the friction materials of Example 10 were determined to be 0.6% total. The scrap rates due to friction no-fills/tearout were 0.10%; set-up 0.10%; cracks 0.01%; friction blisters 0.03%; and other scrap 0.36%.

The friction materials of Example 10 were formed into brake pads, and passed the following vehicle application tests: FMVSS 135 (14% margin stopping distance); life test on vehicle (30,000 miles, minimum); and noise test on vehicle (zero noise).

The brake pads formed of the friction material of Example 10 were also produced at a fraction of the cost of brake pads formed of prior art friction materials, such as those including copper and titanates. The brake pads formed of the inventive friction materials of Example 10 were 30-50% cheaper than those formed of friction materials containing copper and titanates.

The foregoing description discloses exemplary embodiments of the present invention. One skilled in the art will readily recognize from this description, and from the accompanying drawings and claims that various changes, modifications and variations can be made without departing from the spirit and scope of the invention as defined by the claims.

What is claimed is:

1. A friction material for a brake comprising, in percent (%) by volume of said friction material:
    a binder forming 16-24% by volume;
    a fiber forming 4-12% by volume;
    at least one lubricant, each of said lubricants present in said friction material being selected from the group consisting of metal sulfide, non-metal sulfide, antimony trioxide, phthalocyanine, tin powder, and zinc powder;
    said at least one lubricant including at least one of said metal sulfide and said non-metal sulfide;

each of said lubricants present in said friction material together forming at least 2% by volume and not greater than 5% by volume of said friction material;
at least one abrasive forming 10-22% by volume;
a filler forming 46-65% by volume, said filler consisting of at least one component selected from the group consisting of rubber powder, lime, calcium oxide, barytes, graphite, petroleum coke, desulfurized coke, calcium silicate, and friction dust;
said at least one component of said filler including said rubber powder, wherein said rubber powder forms at least 4% by volume of said friction material;
metal fibers forming 0% to not greater than 0.2% by volume;
titanates forming 0% to not greater than 0.2% by volume; and
copper forming 0% to not greater than 0.2% by volume.

2. The friction material of claim 1 wherein said binder comprises phenolic resin.

3. The friction material of claim 1 wherein said binder forms 18-22% by volume.

4. The friction material of claim 1 wherein said fiber comprises at least one of aramid fibers, poly acrylonitrile (PAN) fibers, and cellulose fibers.

5. The friction material of claim 1 wherein said fiber forms 4-8% by volume.

6. The friction material of claim 1 wherein said at least one lubricant includes said metal sulfide, and said metal sulfide includes antimony tri-sulfide and at least one other metal sulfide different from said antimony tri-sulfide.

7. The friction material of claim 1 wherein each of said lubricants together form 2-4% by volume of said friction material.

8. The friction material of claim 1 wherein said abrasives comprise at least one hard abrasive selected from the group consisting of mineral fibers, zirconia, alumina, magnesium oxide, zirconium silicate, silica, silicon dioxide, sand, silicon carbide, mullite, and iron oxide; and at least one mild abrasive selected from the group consisting of: mineral silicate and metallic oxide.

9. The friction material of claim 1 wherein said abrasives comprise a blend of magnesium oxide, mineral fiber, and mica.

10. The friction material of claim 1 wherein said at least one abrasive includes magnesium oxide in an amount of 2-8% by volume.

11. The friction material of claim 1 wherein said at least one abrasive forms 12-18% by volume, based on the total volume of the friction material.

12. The friction material of claim 1 wherein said filler forms 49-57% by volume.

13. The friction material of claim 1 wherein said rubber powder comprises nitrile rubber.

14. The friction material of claim 1 wherein said rubber powder forms 7-11% by volume.

15. The friction material of claim 1 wherein:
said binder is a phenolic resin and forms 18-22% by volume;
said fiber is an aramid and forms 4-8% by volume;
said at least one lubricant includes said metal sulfide, said metal sulfide is a blend of antimony tri-sulfide and at least one other metal sulfide different from said antimony tri-sulfide, and each of said lubricants present in said friction material together forms 2-4% by volume of said friction material;
said at least one abrasive is a blend of mineral fiber, magnesium oxide, and mica and forms 12-18% by volume;
said filler is a blend of said rubber powder, graphite, petroleum coke, barytes, friction dust, and hydrated lime and forms 49-57% by volume; and
said rubber powder is a nitrile rubber and forms 7-11% by volume.

16. A brake pad comprising:
a backing plate;
a friction pad fixed to said backing plate, said friction pad fabricated of a friction material comprising:
a binder forming 16-24% by volume;
a fiber forming 4-12% by volume;
at least one lubricant, each of said lubricants present in said friction material being selected from the group consisting of metal sulfide, non-metal sulfide, antimony trioxide, phthalocyanine, tin powder, and zinc powder;
said at least one lubricant including at least one of said metal sulfide and said non-metal sulfide;
each of said lubricants present in said friction material together forming at least 2% by volume and not greater than 5% by volume of said friction material;
at least one abrasive forming 10-22% by volume;
a filler forming 46-65% by volume, said filler consisting of at least one component selected from the group consisting of rubber powder, lime, calcium oxide, barytes, graphite, petroleum coke, desulfurized coke, calcium silicate, and friction dust;
said at least one component of said filler including said rubber powder, wherein said rubber powder forms at least 4% by volume of said friction material;
metal fibers forming 0% to not greater than 0.2% by volume;
titanates forming 0% to not greater than 0.2% by volume; and
copper forming 0% to not greater than 0.2% by volume.

17. The brake pad of claim 16 formed by a process comprising the steps of:
mixing the binder, the at least one lubricant, the abrasive, and the filler to form a homogeneous mixture comprising, based on the total volume of the mixture:
the binder forming 16-24% by volume, the fiber forming 4-12% by volume, each of the lubricants together forming 2-5% by volume, the at least one abrasive forming 10-22% by volume, the filler forming 46-65% by volume;
pressing the homogeneous mixture under a pressure of 4-25 tons/piece at room temperature to form a friction pad of the mixture;
pressing the friction pad and a backing plate together under a pressure of 5-50 tons/piece at a temperature of 265-295° F.; and
baking the pressed friction pad and backing plate at a temperature of 330-370° F.

18. A method of forming a brake pad, comprising the steps of:
mixing a binder, a fiber, at least one lubricant, an abrasive, and a filler to form a homogeneous mixture comprising, based on the total volume of the mixture:
the binder forming 16-24% by volume; the fiber forming 4-12% by volume; each of the lubricants present in the mixture being selected from the group consisting of metal sulfide, non-metal sulfide, antimony trioxide, phthalocyanine, tin powder, and zinc powder; each of the lubricants present in the mixture together forming at least 2% by volume and not greater than 5% by volume of the mixture; the at least one lubricant including at least one of the metal sulfide and the non-metal sulfide; the at least one abrasive forming 10-22% by volume; the filler forming 46-65% by volume and consisting of at least one component selected from the group consisting of rubber powder, lime, calcium oxide, barytes, graphite, petroleum coke, desulfurized coke, calcium silicate, and friction dust; the at least one component of the filler including the rubber powder, wherein the rubber powder forms at least 4% by volume of the mixture; metal fibers forming 0% to not greater than 0.2% by volume; titanates forming 0% to not greater than 0.2% by volume; and copper forming 0% to not greater than 0.2% by volume;

pressing the homogeneous mixture under a pressure of 4-25 tons/piece at room temperature to form a friction pad of the mixture;

pressing the friction pad and a backing plate together under a pressure of 5-50 tons/piece at a temperature of 265-295° F.; and baking the pressed friction pad and backing plate at a temperature of 330-370° F.

19. The method of claim 18 consisting essentially of said mixing, said pressing, and said baking steps.

20. A friction material for a brake comprising, in percent (%) by volume of said friction material:
a binder forming 21% by volume, said binder being a phenolic resin;
a fiber forming 7% by volume, said fiber being an aramid;
a lubricant forming 2-4% by volume, said lubricant being a blend of antimony tri-sulfide and at least one metal sulfide different from said antimony tri-sulfide; wherein said antimony tri-sulfide of said lubricant forms 2% by volume, and said metal sulfide of said lubricant forms 2% by volume;
an abrasive forming 12-18% by volume and being a blend of mineral fiber, magnesium oxide, and mica; wherein said mineral fiber of said abrasive forms 5% by volume, said magnesium oxide of said abrasive forms 5% by volume, and said mica of said abrasive forms 5% by volume;
a filler forming 49-57% by volume, said filler being a blend of rubber powder, graphite, petroleum coke, barytes, friction dust, and hydrated lime; wherein said rubber powder of said filler is a nitrile rubber and forms 9% by volume, said graphite of said filler forms 6% by volume, said petroleum coke of said filler forms 6% by volume, said barytes of said filler form 21% by volume, said friction dust of said filler forms 9% by volume, and said hydrated lime of said filler forms 2% by volume;
metal fibers forming 0% to not greater than 0.2% by volume;
titanates forming 0% to not greater than 0.2% by volume; and
copper forming 0% to not greater than 0.2% by volume.

21. A method of forming a brake pad, comprising the steps of:
mixing a binder, a fiber, a lubricant, an abrasive, and a filler to form a homogeneous mixture comprising, based on the total volume of the mixture:
the binder forming 21% by volume and being a phenolic resin;
the fiber forming 7% by volume and being an aramid;
the lubricant forming 4% by volume, the lubricant being a blend of antimony tri-sulfide and at least one metal sulfide different from the antimony tri-sulfide, the antimony tri-sulfide of the lubricant forming 2% by volume, and the metal sulfide of the lubricant forming 2% by volume;
the abrasive forming 12-18% by volume, the abrasive being a blend of mineral fiber, magnesium oxide, and mica; the mineral fiber of the abrasive forming 5% by volume, the magnesium oxide of the abrasive forming 5% by volume, and the mica of the abrasive forming 5% by volume;
the filler forming 49-57% by volume, the filler being a blend of rubber powder, graphite, petroleum coke, barytes, friction dust, and hydrated lime; the rubber powder of the filler being a nitrile rubber and forming 9% by volume, the graphite of the filler forming 6% by volume, the petroleum coke of the filler forming 6% by volume, the barytes of the filler forming 21% by volume, the friction dust of the filler forming 9% by volume, and the hydrated lime of the filler forming 2% by volume;
metal fibers forming 0% to not greater than 0.2% by volume;
titanates forming 0% to not greater than 0.2% by volume; and
copper forming 0% to not greater than 0.2% by volume;

pressing the homogeneous mixture under a pressure of 4-25 tons/piece at room temperature to form a friction pad of the mixture;

pressing the friction pad and a backing plate together under a pressure of 5-50 tons/piece at a temperature of 265-295° F.; and baking the pressed friction pad and backing plate at a temperature of 330-370° F.

22. A friction material for a brake consisting of, in percent (%) by volume of said friction material:
a binder forming 16-24% by volume;
a fiber forming 4-12% by volume;
a lubricant-forming 2-5% by volume, said lubricant consisting of at least one component selected from the group consisting of metal sulfide, non-metal sulfide, antimony trioxide, phthalocyanine, tin powder, and zinc powder;
said lubricant including at least one of said metal sulfide and said non-metal sulfide;
at least one abrasive forming 10-22% by volume;
a filler forming 46-65% by volume, said filler consisting of at least one component selected from the group consisting of rubber powder, lime, calcium oxide, barytes, graphite, petroleum coke, desulfurized coke, calcium silicate, and friction dust;
said at least one component of said filler including said rubber powder, wherein said rubber powder forms at least 4% by volume of said friction material;
metal fibers forming 0% to not greater than 0.2% by volume;
titanates forming 0% to not greater than 0.2% by volume; and
copper forming 0% to not greater than 0.2% by volume.

23. A method of forming a brake pad, comprising the steps of:
mixing a binder, a fiber, a lubricant, an abrasive, and a filler to form a homogeneous mixture consisting of, based on the total volume of the mixture:
the binder forming 16-24% by volume; the fiber forming 4-12% by volume; the lubricant forming 2-5% by volume and consisting of at least one component selected from the group consisting of metal sulfide, non-metal sulfide, antimony trioxide, phthalocyanine, tin powder, and zinc powder; the lubricant including at least one of the metal sulfide and the non-metal sulfide; at least one abrasive forming 10-22% by volume; the filler forming 46-65% by volume and consisting of at least one component selected from the group consisting of rubber powder, lime, calcium oxide, barytes, graphite, petroleum coke, desulfurized coke, calcium silicate, and friction dust; the at least one component of the filler including the rubber powder, wherein the rubber powder forms at least 4% by volume of the mixture; metal fibers forming 0% to not greater than 0.2% by volume; titanates forming 0% to not greater than 0.2% by volume; and copper forming 0% to not greater than 0.2% by volume;

pressing the homogeneous mixture under a pressure of 4-25 tons/piece at room temperature to form a friction pad of the mixture;

pressing the friction pad and a backing plate together under a pressure of 5-50 tons/piece at a temperature of 265-295° F.; and baking the pressed friction pad and backing plate at a temperature of 330-370° F.

* * * * *

UNITED STATES PATENT AND TRADEMARK OFFICE
CERTIFICATE OF CORRECTION

PATENT NO. : 8,863,917 B2
APPLICATION NO. : 13/212445
DATED : October 21, 2014
INVENTOR(S) : Vijay Subramanjan It is certified that error appears in the above-identified patent and that said Letters Patent is hereby corrected as shown below:

In the Drawings

Delete Drawing Sheet and substitute therefore with the attached Drawing Sheet. The label "FIG. 1" has been added.

In the Specification

Column 3, Line 30 - 'me' should read 'metal';
Column 3, Line 64 - '0 5' should read '0.5'.

Signed and Sealed this
Twenty-first Day of April, 2015

Michelle K. Lee
*Director of the United States Patent and Trademark Office*